Oct. 17, 1944. L. J. ALLEN 2,360,534
MUSICAL SCORE
Filed March 31, 1943 2 Sheets-Sheet 2
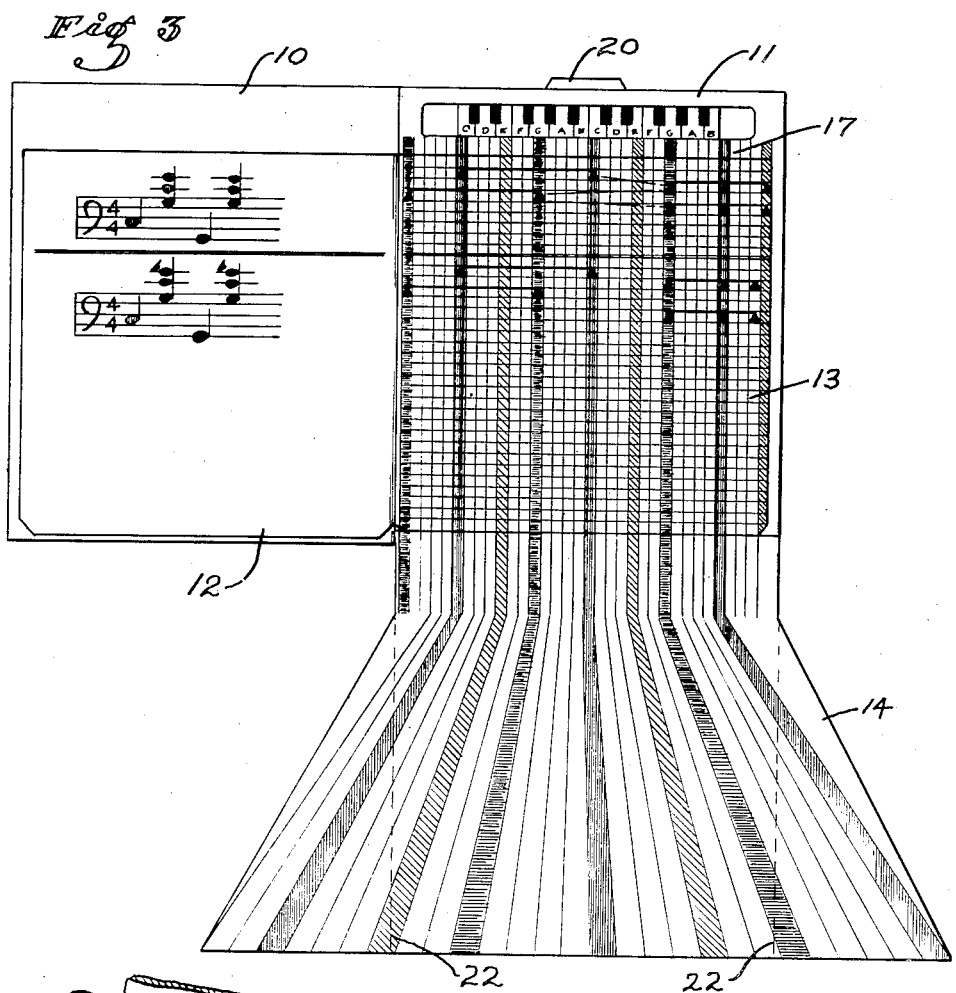
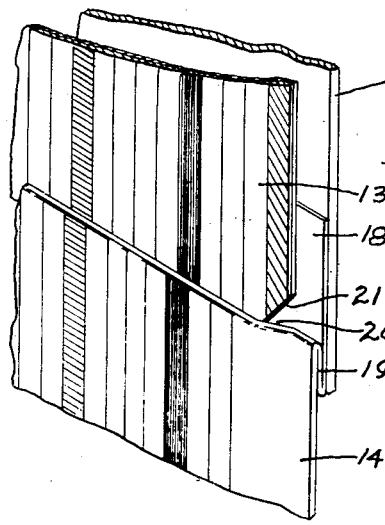
INVENTOR.
LAWRENCE J. ALLEN
BY
Castberg & Roemer
ATTORNEYS.

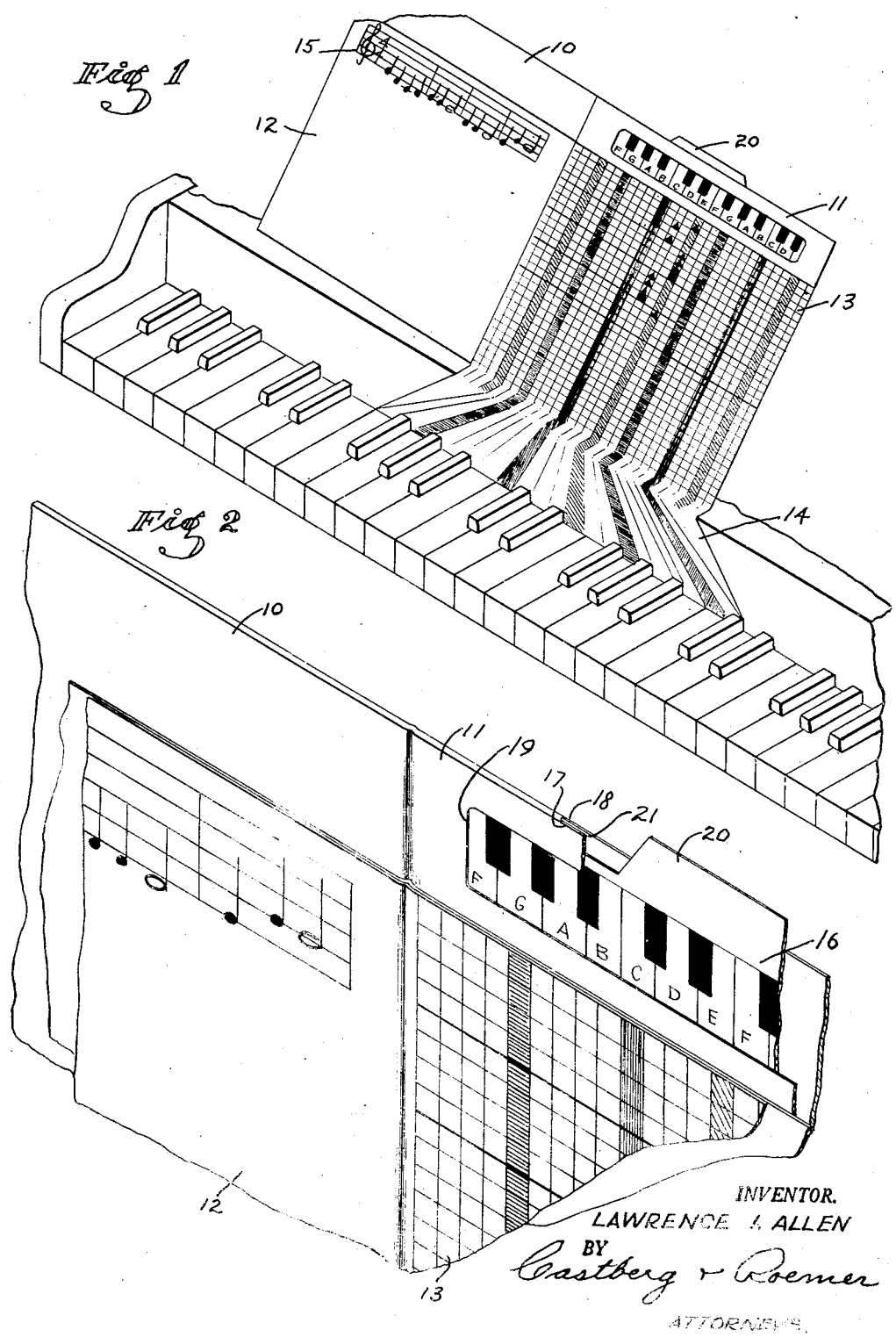

Patented Oct. 17, 1944

2,360,534

UNITED STATES PATENT OFFICE 2,360,534

MUSICAL SCORE

Lawrence J. Allen, Seattle, Wash.

Application March 31, 1943, Serial No. 481,180

7 Claims. (Cl. 84—483)

The present invention relates to a musical score, and more particularly to the incorporation in a book having certain structural features of a novel musical score so related to such features as to produce a mechanical aid to piano or musical instruction.

My invention, which makes possible the instruction, playing, and even writing of music by a greatly simplified and enjoyable method, embodies a book which may be placed on the music rack of a piano in the manner of conventional sheet music. The forward, or right hand sides, of the pages as they are spread open on the rack contain musical notations in a simplified arrangement on a vertical score. The backs of the pages, or what appears as the left hand page when the book is spread open, have printed upon them a conventional musical score of the same music which appears at the right. A fan-shaped apron which forms an integral part of the book may be arranged to provide a continuation of the right-hand page, and in effect to form an extension of said page toward the key-board of the piano. This apron-like extension bears printed lines which serve visibly to connect the keys of the piano with the vertical spaces on the score with which the individual keys correspond. A system of distinctive lines, preferably colored, runs through the three major elements of the book, that is, the conventional score on the left hand page, the simplified vertical score on the right hand page, and the apron, in such a manner that the eye quickly associates actual key-board positions with musical notations both of the conventional and the simplified score. There is also provided as an integral part of the book, a key transposing device arranged in a manner to enable its use with the musical notations of the simplified score on any page, and serving to facilitate transposition of the key in which the score is written.

The invention which will be more fully described in the following specification, and clarified by reference therein to the accompanying drawings, has for its object provision of a musical score and arrangement thereof in a book which will facilitate the study of music and simplify the reading of music by unskilled as well as skilled musicians.

A further object of the invention is to provide means by which composed music may be recorded in a simple manner which may be practiced by persons not sufficiently familiar with the conventional musical score to enable its use for composing.

Further objects and advantages of the invention are made apparent in the following specification.

In the drawings:

Figure 1 is a perspective view illustrating a portion of a piano key-board and a book containing a musical score embodying the present invention arranged thereabove;

Figure 2 is an enlarged detail in perspective of the upper central portion of the book illustrated in Figure 1;

Figure 3 is a front elevation of the same book spread open and illustrating the structural details not shown in Figure 1; and Figure 4 is an enlarged detail and perspective of the lower right hand corner of the book illustrated in Figure 3 illustrating the manner in in which the apron is connected with the book, and particularly the manner in which registry is insured between the musical score on the right hand page and the lines which appear on the apron.

The preferred form of the invention which is illustrated in the drawings comprises a book having a front cover 10 and a back cover 11. The pages of the book which are secured between the covers in a conventional manner may be opened to present the back side of one page at the same time that the front side of the other page is being viewed, or to present simultaneously, for purposes of convenience of expression what may be referred to as, a left hand page 12 and a right hand page 13. On the left hand page there is printed, as indicated in Figure 1, a conventional musical score 15 while on the right hand page there appears a simplified vertical score which covers substantially the full page. This score consists of a vertical division of the page into narrow strips, each representing a half tone in the musical scale. These strips may be numbered, named, and distinctively colored or shaded to identify them with certain notes in the scale. Music is noted on this vertical score by marks appearing in the vertical strips, the sequence and duration of the notes, and chords characterized by these marks or designated by their arrangement vertically on the page and by their vertical length. The page is also divided by horizontal lines to represent beats and measures. Heavy lines preferably are used at intervals which indicate a measure, while the lighter lines between the heavy lines represent the number of beats in the measure. 4–4 time, for example, being illustrated in Fig. 1. The principal notes of the scale, such for example in the key of "C," as "C," "E" and "G," are caused to stand out on the vertical score preferably through distinctive coloring. For this purpose red may be used for "C," green for "E" and blue for "G" as indicated on the drawings, thus facilitating the visual interpretation of the musical notes printed thereon.

Depending from the right hand page 13 is a paper apron 14 arranged in such a manner that it may be curved downwardly over the drop-board of the piano so that its lower edge may be tucked behind the key-board. On this apron 14 are diverging lines arranged in such a manner that their upper ends register with the lines of the vertical score on the right hand page, and their lower ends register with the keys on the piano key-board, thus forming bands which connect or identify each individual key on the key-board with the vertical space on the musical score to which it corresponds. Thus in playing the music noted on the score, it is necessary only to observe the position of the mark representing a note, then to follow downwardly with the eye the vertical space in which said mark is printed, which space eventually leads to the proper corresponding key for sounding the intended note. This function is greatly facilitated by the coloring of the vertical space on the score and bands on the apron 14 which identify the principal notes of the scale and simplify the visual act of tracing the position of a note on the score to its corresponding position on the key-board. In order that the invention will be useful in teaching a student of music, and particularly a beginner, to read music from the conventional score, the conventional score is printed on the left hand page with the same musical composition as that which appears on the right hand page. To simplify even further the reading of the music on the conventional score, the notes thereon are, as shown in Fig. 3, printed in color and the color of the notes which follow on the principal notes of the scale, are the same as the colors used in the vertical score on the right hand page. For example, in Fig. 3, wherein the first major chord and first minor chord are shown for the key of "C," all of the notes on the conventional score have a color which identifies them with the vertical spaces in which they are found on the vertical score on the opposite page. Thus, the novice, with no knowledge whatsoever of music, can sound the chords by following the positions shown on the vertical score, and at the same time note the arrangement of musical symbols on the conventional score, and an impression of sound, color and spacing will at once be gained, which through repetition will serve to identify the spacing of the conventional score with the position of the hands on the piano.

Printed directly above the vertical score on the right hand page is a replica miniature of the piano key-board so arranged that each key thereon is substantially in line with its corresponding vertical space on the music, the white keys each bearing a letter which identifies them with their designation in the scale. For the purpose of transposing the key in which the music is printed on the vertical score, it is simply necessary to adjust the position of this replica of the key-board and correspondingly to adjust the position of the entire book so that the apron is shifted with relation to the key-board of the piano. To facilitate this adjustment, and to make it possible for a single key-transposing device to serve for all of the pages of the book, a small key-board is printed as best shown in Figure 2 on a card 16 which is slidably arranged between layers 17 and 18 which form the back cover 11. This card is viewed through an opening 19 on the inside of the cover and has a tab 20 which extends upwardly through a slot 21 in the upper edge of the cover so that it may be adjusted horizontally. For playing in the key of "C," the key C on the card is aligned as shown in Fig. 2 with the red space on the vertical score. In order to transpose the music to play in the key of "D" the card would be moved two spaces to the left so that the key D would be aligned with the vertical red area, and at the same time the book would be shifted on the music rack until the continuation of this red area registered with the "D" key of the piano. By reading the vertically arranged score in the manner previously described, the music can then be played in the key of "D" and similar adjustments may be made for playing in any desired key. The adjustable key transposing device is arranged, as described, in the upper edge of the back cover of the book and the pages upon which the music is printed are considerably shorter than the covers of the book so that the transposing device is always visible and may be used for every page in the book. Where some space exists between the upper edge of the page and the transposing device, it may be desirable, as shown in Fig. 3, to print lines and colored bands at 17 which correspond with the vertical spaces on the musical score, thus connecting them with the key transposing device.

It may be possible that in turning the pages of the book, particularly if they are printed on frail paper, that eventually the pages would bend or sag slightly, and fail properly to align with the key transposing device and the apron 14. To insure against this the apron may be constructed as shown in Fig. 4 to support the pages in their proper position. In this figure the apron 14 is shown as having its upper end designated at 18 glued to the back cover 11. A double fold is then placed in the apron as indicated at 19 which is glued at its ends only so as to provide a pocket 20 which receives the lower ends of the pages while they are in position against the back of the book. The lower corners of the pages are cut off at an angle as indicated at 21 to facilitate their insertion and removal from the pocket as the pages of the book are turned. The apron which is fan-shaped, or larger at its bottom than at its top to compensate for the difference between the size of the actual piano key-board and the vertical spacing on the pages 13, is shown in Fig. 3 as having folding lines which are indicated by dotted lines 22 so that its lower corners may be folder inwardly. With these corners folded inwardly, the entire apron may be folded upwardly to be received against the inner surface of the back or front cover of the book so that when closed, the apron is entirely contained between its covers.

In order to use the book it is simply necessary for it to be placed on the conventional music rack of any piano. The book is then opened and the apron lowered and adjusted with its main red vertical band disposed behind the "C" key of the piano key-board or any key in which the music is to be played. The key transposing device is adjusted to the corresponding key. Sight reading of the music noted on the vertical score is then automatic as the keys to be struck are clearly depicted. The color bands which run through the vertical score and the apron and which are indicated on the notes printed on the conventional score facilitate reading of both scores. Music printed in a single key may readily be played in any key by reason of the simple transposing device. It is apparent that the invention will serve as an aid to instruction and it may readily be seen how the vertical score, particularly used in conjunction with the apron, will serve as a convenience to composers of music who are not sufficiently familiar with the conventional score to use it freely in noting musical pieces which are composed on the key-board. While the vertical score shown is printed with a comparatively small range, this is for the purpose of convenience in illustrating, and it is to be understood that the number of vertical bands on the page may be increased depending upon the width of the bands and the size of the page. The apron may cover as large a portion of the key-board as desired although approximately two octaves of the board is sufficient for most practical purposes. Other variations from the specific form of the invention as it is herein illustrated and described may be made without departing from the spirit and scope of the invention which is limited only by the appended claims.

Having thus described my invention, what I claim and desire to secure by Letters Patent is:

1. A musical score comprising a page having vertical divisions corresponding to notes on the musical scale, and an apron adapted to depend from the bottom of said page toward the keyboard of a piano when the page is supported on the piano music rack, said apron having lines printed thereon to visibly associate the keys of the piano with their respective vertical divisions on the page.

2. A musical score in book form presenting left and right hand pages when opened on a music rack, a conventional score printed on the left hand pages, a vertical score printed on the right hand pages, and an apron adapted to extend downwardly from the right hand pages and having printed lines to connect areas of the vertical score with keys of a piano key-board.

3. A musical score in book form presenting left and right hand pages when opened on a music rack, a conventional score printed on the left hand pages, a vertical score printed on the right hand pages, an apron adapted to extend downwardly from the right hand pages and having printed lines to connect areas of the vertical score with keys of a piano key-board, certain notes of the scale being identified by colors on both scores, and colored bands printed on the apron to identify keys of the piano with the notes represented in color on the scores.

4. A musical score in book form presenting left and right hand pages when opened on a music rack, a conventional score printed on the left hand pages, a vertical score printed on the right hand pages, and an apron carried by the back cover of the book and adapted to extend downwardly toward a piano key-board and having lines printed thereon extending between spaces on the vertical score and corresponding keys on the keyboard.

5. A musical score in book form presenting left and right hand pages when opened on a music rack, a conventional score printed on the left hand pages, a vertical score printed on the right hand pages, an apron carried by the back cover of the book and adapted to extend downwardly toward a piano key-board and having lines printed thereon extending between spaces on the vertical score and corresponding keys on the keyboard, said apron being secured to the lower edge of the book cover and having a fold therein to serve as a pocket to receive the lower edges of the book pages.

6. A musical score in book form having a vertical score printed on the pages of the book in which vertical areas correspond to notes in the musical scale, and a key transposing device carried by the cover of the book and visible over the tops of the pages.

7. A musical score in book form having a vertical score printed on the pages of the book in which vertical areas correspond to notes in the musical scale, a key transposing device carried by the cover of the book and visible over the tops of the pages, said key transposing device comprising a printed replica of a piano key-board in which the keys register with their corresponding vertical areas on the score, and means for supporting said device for horizontal adjustment.

LAWRENCE J. ALLEN.